United States Patent
Bunin et al.

(10) Patent No.: US 12,493,694 B2
(45) Date of Patent: Dec. 9, 2025

(54) ANTI-MALWARE ALGORITHM AND HW/FW FOR INTERNAL SSD HEALTH AND STORAGE SPACE PROTECTION AGAINST CYBER-ATTACKS

(71) Applicant: SAMSUNG ELECTRONICS CO., LTD., Suwon-si (KR)

(72) Inventors: Alexander Bunin, Ganei Tikva (IL); Evgeny Blaichman, Tel-Aviv (IL); Amit Berman, Binyamina (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 252 days.

(21) Appl. No.: 17/879,363

(22) Filed: Aug. 2, 2022

(65) Prior Publication Data
US 2024/0045958 A1 Feb. 8, 2024

(51) Int. Cl.
*G06F 21/56* (2013.01)
*G06F 21/70* (2013.01)

(52) U.S. Cl.
CPC ............ *G06F 21/566* (2013.01); *G06F 21/70* (2013.01)

(58) Field of Classification Search
CPC ........ G06F 21/566; G06F 21/70; G06F 21/56; G06F 21/79; G06F 21/552; G06Q 20/3829; G06Q 20/065; G06N 3/044; G06N 3/0464; G06N 20/00
USPC .......................................................... 726/23
See application file for complete search history.

(56) References Cited

U.S. PATENT DOCUMENTS

| | | | |
|---|---|---|---|
| 11,526,502 B1* | 12/2022 | Harris | G06F 16/252 |
| 2016/0041778 A1* | 2/2016 | Li | G06F 3/0616 |
| | | | 711/114 |
| 2020/0053109 A1* | 2/2020 | Lancioni | H04L 63/1425 |
| 2020/0202000 A1* | 6/2020 | Gross | G06F 11/3466 |
| 2020/0387597 A1* | 12/2020 | Karasev | G06F 21/566 |
| 2021/0103529 A1* | 4/2021 | Lin | G06F 3/0637 |
| 2021/0111979 A1* | 4/2021 | Reid | H04L 9/0819 |
| 2021/0200450 A1* | 7/2021 | Lim | G06F 3/0653 |

(Continued)

FOREIGN PATENT DOCUMENTS

| | | | | |
|---|---|---|---|---|
| CN | 117473495 A | * | 1/2024 | ......... G06F 11/1415 |
| CN | 117495371 A | * | 2/2024 | ......... G06F 21/566 |

OTHER PUBLICATIONS

Banerjee, "Cryptojacking attacks rise as hackers try to exploit boom", https://www.livemint.com/market/cryptocurrency/crptojacking-attacks-rise-as-hackers-try-to-exploit-boom-11622892050042.html, Jun. 5, 2021, (7 pages total).

*Primary Examiner* — Taghi T Arani
*Assistant Examiner* — Pegah Barzegar
(74) *Attorney, Agent, or Firm* — Sughrue Mion, PLLC

(57) ABSTRACT

A storage system, including a host device; and a storage device including a nonvolatile memory and at least one processor configured to implement a storage internal protection (SIP) module, wherein the SIP module is configured to: obtain, from the host device, a plurality of storage commands corresponding to the nonvolatile memory, filter the plurality of storage commands to obtain a filtered plurality of storage commands, apply information about the filtered plurality of storage commands to a machine-learning cryptocurrency mining (CM) detection algorithm, and based on the machine-learning CM detection algorithm indicating that a CM operation is detected, provide a notification to the host device.

18 Claims, 11 Drawing Sheets

(56) References Cited

U.S. PATENT DOCUMENTS

| | | | |
|---|---|---|---|
| 2022/0231964 A1* | 7/2022 | Alam | H04L 47/74 |
| 2022/0394051 A1* | 12/2022 | Simon | H04L 63/145 |
| 2023/0300075 A1* | 9/2023 | Peri | H04L 47/225 |
| | | | 370/412 |
| 2024/0037233 A1* | 2/2024 | Doubchak | G06F 21/566 |
| 2024/0045958 A1* | 2/2024 | Bunin | G06F 21/566 |

* cited by examiner

ANTI-MALWARE ALGORITHM AND HW/FW FOR INTERNAL SSD HEALTH AND STORAGE SPACE PROTECTION AGAINST CYBER-ATTACKS

BACKGROUND

1. Field

Apparatuses and methods consistent with embodiments relate to protection of storage devices, more particularly a detecting crypto-jacking and other malicious crypto-mining operations.

2. Description of Related Art

The term "cryptocurrency" may refer to digital currencies. All of the transactions of those currencies may be stored in a distributed online database. A cryptocurrency is anonymous, because the money may be stored in a digital wallet, which may not be connected to the owner's identity, and decentralized, because the transaction history may be stored in multiple copies across the web, such that no single entity can monitor or block transactions. As a result the currency may not be controlled or regulated by any authority such as government or bank.

Aside from receiving cryptocurrency from another user, a user can generate new cryptocurrency, for example in the form of crypto coins, using a procedure which may be referred to as mining. To do so, the user may be required to invest resources in the mining. For example, Bitcoin, which is a popular cryptocurrency, is mined by performing heavy computations on the CPU, which in turn results in extensive power consumption.

The anonymity of cryptocurrency makes it particularly useful for malicious actors such as hackers. For example, there is a type of malicious software called ransomware, which encrypts data on the victim's computer and then demands payment (the ransom) to supply the key for decryption. The ransom is usually demanded in cryptocurrency. Another way a malicious hacker can earn cryptocurrency is by exploiting the victim's resources for generation of new crypto coins. This type of attack may be referred to as a crypto-mining attack, or cryptojacking. For example, a hacker that runs a Bitcoin mining attack may cause the victim monetary loss in the form of power consumed by the CPU, and the wear out of the machine.

Several new cryptocurrencies, for example Filecoin and Chia, use storage resources for their mining, instead of computational resources as for Bitcoin. A crypto-mining attack based on such a cryptocurrency could have devastating effects on a victim's storage device, for example a solid state drive (SSD) storage device. In general, storage commands such as Non-Volatile Memory express (NVMe) commands to an SSD, may be executed without any monitoring or filtering inside the SSD. Accordingly, malicious software, which may be referred to as malware, can perform storage based crypto-currency mining, occupy storage space on the SSD, and degrade its health by performing multiple program/erase (P/E) cycles. For example, using a victim's SSD device to prepare for Chia mining or farming, a procedure called plotting, can significantly degrade the device's performance, and even wear it out completely in a matter of weeks.

Current protections against cyber-attacks are located mostly in the software layer, for example in antivirus or firewall software, which may be insufficient to protect against all malicious crypto-mining or cryptojacking attacks. As a result, there is a need for protection against cyber-attacks that use the victim's storage device by occupying storage quota and/or performing multiple P/E cycles.

SUMMARY

In accordance with an aspect of the disclosure, a storage system includes a host device; and a storage device including a nonvolatile memory and at least one processor configured to implement a storage internal protection (SIP) module, wherein the SIP module is configured to: obtain, from the host device, a plurality of storage commands corresponding to the nonvolatile memory, filter the plurality of storage commands to obtain a filtered plurality of storage commands, and extract information about the filtered plurality of storage commands, apply information about the filtered plurality of storage commands to a machine-learning cryptocurrency mining (CM) detection algorithm, and based on the machine-learning CM detection algorithm indicating that a CM operation is detected, provide a notification to the host device.

In accordance with an aspect of the disclosure, a storage device includes a nonvolatile memory; and at least one processor configured to: obtain a plurality of storage commands corresponding to the nonvolatile memory, filter the plurality of storage commands to obtain a filtered plurality of storage commands, and extract information about the filtered plurality of storage commands, apply information about the filtered plurality of storage commands to a machine-learning cryptocurrency mining (CM) detection algorithm, and based on the machine-learning CM detection algorithm indicating that a CM operation is detected, provide a notification to a user of the storage device.

In accordance with an aspect of the disclosure, a method of controlling a storage system, is performed by a storage internal protection (SIP) module implemented by at least one processor included in a storage device of the storage system, and includes: obtaining, from a host device included in the storage system, a plurality of storage commands corresponding to a nonvolatile memory of the storage device, filtering the plurality of storage commands to obtain a filtered plurality of storage commands, and extracting information about the filtered plurality of storage commands, applying information about the filtered plurality of storage commands to a machine-learning cryptocurrency mining (CM) detection algorithm, and based on the machine-learning CM detection algorithm indicating that a CM operation is detected, providing a notification to the host device.

In accordance with an aspect of the disclosure, a method of controlling a storage device, is performed by at least one processor and includes obtaining a plurality of storage commands corresponding to a nonvolatile memory included in the storage device, filtering the plurality of storage commands to obtain a filtered plurality of storage commands, and extracting information about the filtered plurality of storage commands, applying information about the filtered plurality of storage commands to a machine-learning cryptocurrency mining (CM) detection algorithm, and based on the machine-learning CM detection algorithm indicating that a CM operation is detected, providing a notification to a user of the storage device.

DETAILED DESCRIPTION

As discussed above, there is a need for protection against cyber-attacks that use a victim's storage device, for example a solid state drive (SSD) storage device, by occupying storage quota and/or performing multiple program/erase (P/E) cycles. Accordingly, embodiments may relate to SSD which includes internal protection for its own storage quota and health against crypto-mining attacks. In embodiments, a storage device may detect storage-based crypto-mining that is performed using the storage device, and may alert the user, who can then take action if needed.

For example, embodiments may provide systems, methods, and devices which protect a storage device against cyber-attacks such as malicious crypto-mining or crypto-jacking, which may occupy the storage of the device, and/or degrade its health by multiple P/E cycles. In embodiments, a protection layer may be added inside a storage device such as an SSD. The protection layer may sniff the input and output commands to the storage device, for example using the NVMe protocol, and analyze them. Machine-learning algorithms may be employed to detect use of the storage device for crypto-mining of cyrptocurrencies which may rely on storage, for example Chia and Filecoin. In embodiments, based on such crypto-mining being detected, an alert corresponding to the crypto-mining activity may be passed to a software application monitoring the storage device.

As a result, a user or owner of the storage device may be alerted that crypto-currency mining takes place on the storage device. Then, the user can take action to stop the activity, for example if the activity is not intended. An added protection layer is added for the storage against several cyber-attacks that occupy storage on the device and/or perform multiple P/E cycles, thus wearing the device out. The detection of threats may be performed, for example, based on the NVMe communication protocol.

Accordingly, embodiments may provide advantages over protections reside only in the software layer, for example antivirus or firewall software. For example, software-only protections may require different implementations corresponding to multiple different operating systems or computer hardware configurations. In addition, hackers and other creators of malicious software may have significant experience evading such software-only protections.

In contrast, embodiments may provide crypto-mining and cryptojacking protection that is compatible across multiple platforms. In addition, embodiments may reduce a workload of a central processing unit (CPU) of a host by performing, in the storage device, operations that would otherwise be required to be performed by the CPU. Also, embodiments may have access to information that may not be available to software-only protections, for example data included in logically-erased blocks, and therefore may provide increased malware detection and data recovery capabilities.

Figure 1:
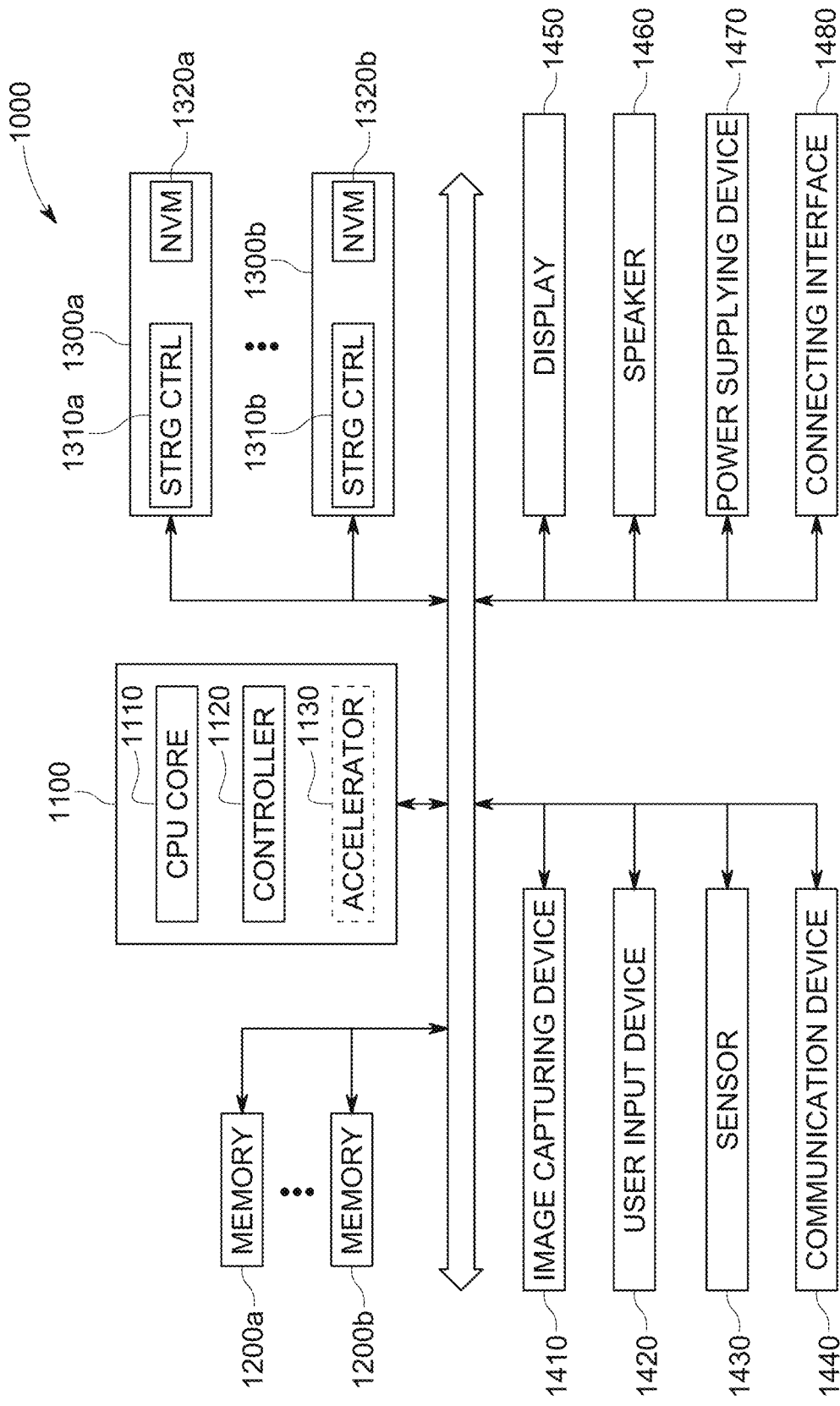
FIG. 1 is a block diagram of a computer system, according to embodiments.

FIG. 1 is a diagram of a system 1000 to which embodiments may be applied. The system 1000 of FIG. 1 may be, for example, a mobile system, such as a portable communication terminal (e.g., a mobile phone), a smartphone, a tablet personal computer (PC), a wearable device, a healthcare device, or an Internet of things (IOT) device. However, the system 1000 of FIG. 1 is not necessarily limited to the mobile system and may be a PC, a laptop computer, a server, a media player, or an automotive device (e.g., a navigation device).

Referring to FIG. 1, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a and 1200b may be used as main memory devices of the system 1000. Although each of the memories 1200a and 1200b may include a volatile memory, such as static random access memory (SRAM) and/or dynamic RAM (DRAM), each of the memories 1200a and 1200b may include non-volatile memory, such as a flash memory, phase-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers (STRG CTRL) 1310a and 1310b and Non-Volatile Memories (NVMs) 1320a and 1320b configured to store data via the control of the storage controllers 1310a and 1310b. Although the NVMs 1320a and 1320b may include flash memories having a two-dimensional (2D) structure or a three-dimensional (3D) V-NAND structure, embodiments are not limited thereto, and the NVMs 1320a and 1320b may include other types of NVMs, such as PRAM and/or RRAM.

The storage devices 1300a and 1300b may be physically separated from the main processor 1100 and included in the system 1000 or implemented in the same package as the main processor 1100. In addition, the storage devices 1300a and 1300b may have types of SSDs or memory cards, and may be removably combined with other components of the system 100 through an interface, such as the connecting interface 1480 described below. The storage devices 1300a and 1300b may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 maybe implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

Figure 2:
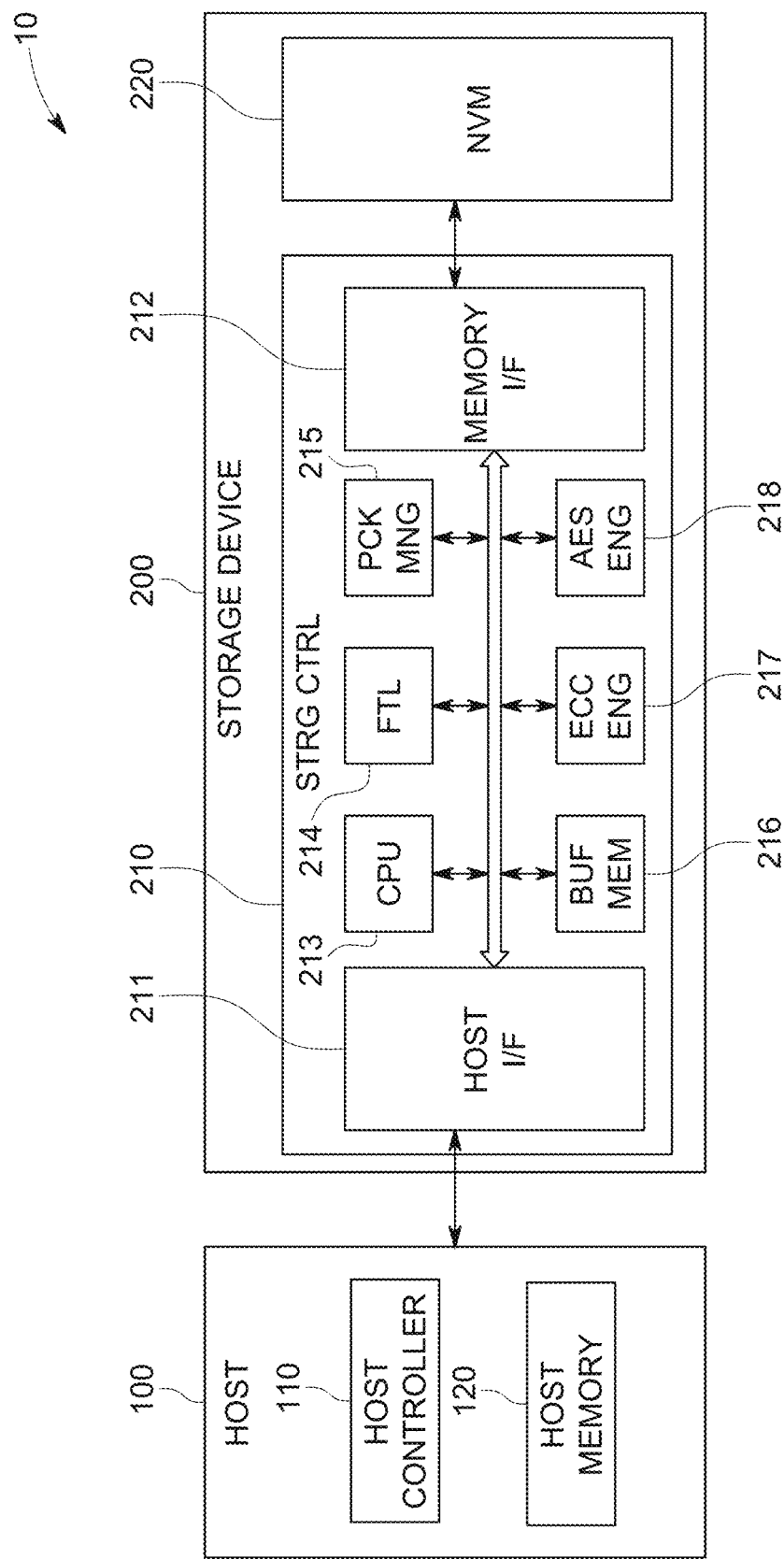
FIG. 2 is a block diagram of a host storage system, according to embodiments.

FIG. 2 is a block diagram of a host storage system 10 according to an example embodiment.

The host storage system 10 may include a host 100 and a storage device 200. Further, the storage device 200 may include a storage controller 210 and an NVM 220. According to an example embodiment, the host 100 may include a host controller 110 and a host memory 120. The host memory 120 may serve as a buffer memory configured to temporarily store data to be transmitted to the storage device 200 or data received from the storage device 200.

The storage device 200 may include storage media configured to store data in response to requests from the host 100. As an example, the storage device 200 may include at least one of an SSD, an embedded memory, and a removable external memory. When the storage device 200 is an SSD, the storage device 200 may be a device that conforms to an NVMe standard. When the storage device 200 is an embedded memory or an external memory, the storage device 200 may be a device that conforms to a UFS standard or an eMMC standard. Each of the host 100 and the storage device 200 may generate a packet according to an adopted standard protocol and transmit the packet.

When the NVM 220 of the storage device 200 includes a flash memory, the flash memory may include a 2D NAND memory array or a 3D (or vertical) NAND (VNAND) memory array. As another example, the storage device 200 may include various other kinds of NVMs. For example, the storage device 200 may include magnetic RAM (MRAM), spin-transfer torque MRAM, conductive bridging RAM (CBRAM), ferroelectric RAM (FRAM), PRAM, RRAM, and various other kinds of memories.

According to embodiments, the host controller 110 and the host memory 120 may be implemented as separate semiconductor chips. In some embodiments, the host controller 110 and the host memory 120 may be integrated in the same semiconductor chip. As an example, the host controller 110 may be any one of a plurality of modules included in an application processor (AP). The AP may be implemented as a System on Chip (SoC). Further, the host memory 120 may be an embedded memory included in the AP or an NVM or memory module located outside the AP.

The host controller 110 may manage an operation of storing data (e.g., write data) of a buffer region of the host memory 120 in the NVM 220 or an operation of storing data (e.g., read data) of the NVM 220 in the buffer region.

The storage controller 210 may include a host interface 211, a memory interface 212, and a CPU 213. Further, the storage controllers 210 may further include a flash translation layer (FTL) 214, a packet manager 215, a buffer memory 216, an error correction code (ECC) engine 217, and an advanced encryption standard (AES) engine 218. The storage controllers 210 may further include a working memory (not shown) in which the FTL 214 is loaded. The CPU 213 may execute the FTL 214 to control data write and read operations on the NVM 220.

The host interface 211 may transmit and receive packets to and from the host 100. A packet transmitted from the host 100 to the host interface 211 may include a command or data to be written to the NVM 220. A packet transmitted from the host interface 211 to the host 100 may include a response to the command or data read from the NVM 220. The memory interface 212 may transmit data to be written to the NVM 220 to the NVM 220 or receive data read from the NVM 220. The memory interface 212 may be configured to comply with a standard protocol, such as Toggle or open NAND flash interface (ONFI).

The FTL 214 may perform various functions, such as an address mapping operation, a wear-leveling operation, and a garbage collection operation. The address mapping operation may be an operation of converting a logical address received from the host 100 into a physical address used to actually store data in the NVM 220. The wear-leveling operation may be a technique for preventing excessive deterioration of a specific block by allowing blocks of the NVM 220 to be uniformly used. As an example, the wear-leveling operation may be implemented using a firmware technique that balances erase counts of physical blocks. The garbage collection operation may be a technique for ensuring usable capacity in the NVM 220 by erasing an existing block after copying valid data of the existing block to a new block.

The packet manager 215 may generate a packet according to a protocol of an interface, which consents to the host 100, or parse various types of information from the packet received from the host 100. In addition, the buffer memory 216 may temporarily store data to be written to the NVM 220 or data to be read from the NVM 220. Although the buffer memory 216 may be a component included in the storage controllers 210, the buffer memory 216 may be outside the storage controllers 210.

The ECC engine 217 may perform error detection and correction operations on read data read from the NVM 220. More specifically, the ECC engine 217 may generate parity bits for write data to be written to the NVM 220, and the generated parity bits may be stored in the NVM 220 together with write data. During the reading of data from the NVM 220, the ECC engine 217 may correct an error in the read data by using the parity bits read from the NVM 220 along with the read data, and output error-corrected read data.

The AES engine 218 may perform at least one of an encryption operation and a decryption operation on data input to the storage controllers 210 by using a symmetric-key algorithm.

Figure 3:
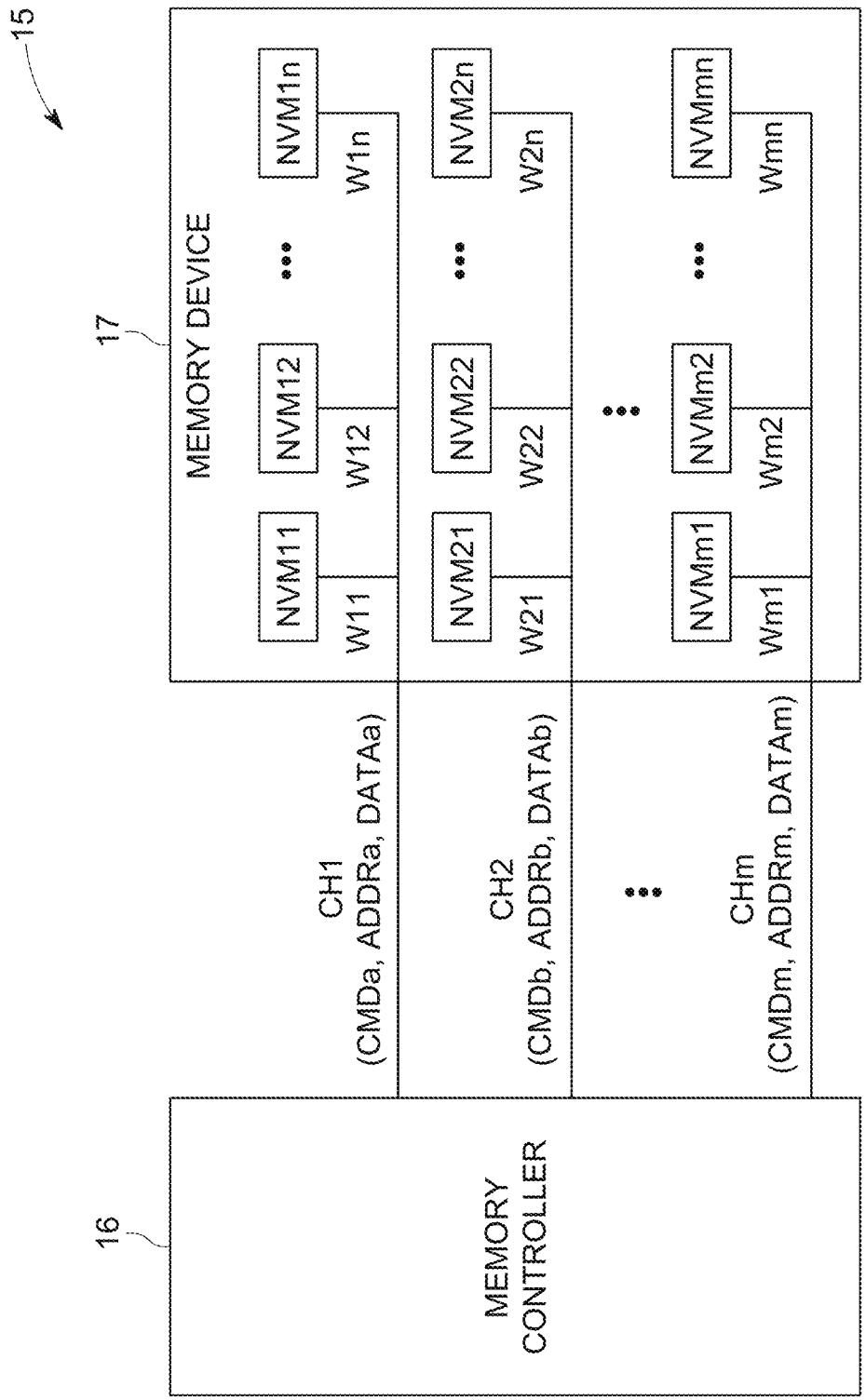
FIG. 3 is a block diagram of a memory system, according to embodiments.

FIG. 3 is a block diagram of a memory system 15 according to embodiments. Referring to FIG. 3, the memory system 15 may include a memory device 17 and a memory controller 16. The memory system 15 may support a plurality of channels CH1 to CHm, and the memory device 17 may be connected to the memory controller 16 through the plurality of channels CH1 to CHm. For example, the memory system 15 may be implemented as a storage device, such as an SSD.

The memory device 17 may include a plurality of NVM devices NVM11 to NVMmn. Each of the NVM devices NVM11 to NVMmn may be connected to one of the plurality of channels CH1 to CHm through a way corresponding thereto. For instance, the NVM devices NVM11 to NVM1n may be connected to a first channel CH1 through ways W11 to W1n, and the NVM devices NVM21 to NVM2n may be connected to a second channel CH2 through ways W21 to W2n. In an example embodiment, each of the NVM devices NVM11 to NVMmn may be implemented as an arbitrary memory unit that may operate according to an individual command from the memory controller 16. For example, each of the NVM devices NVM11 to NVMmn may be implemented as a chip or a die, but the inventive concept is not limited thereto.

The memory controller 16 may transmit and receive signals to and from the memory device 17 through the plurality of channels CH1 to CHm. For example, the memory controller 16 may transmit commands CMDa to CMDm, addresses ADDRa to ADDRm, and data DATAa to DATAm to the memory device 17 through the channels CH1 to CHm or receive the data DATAa to DATAm from the memory device 17.

The memory controller 16 may select one of the NVM devices NVM11 to NVMmn, which is connected to each of the channels CH1 to CHm, by using a corresponding one of the channels CH1 to CHm, and transmit and receive signals to and from the selected NVM device. For example, the memory controller 16 may select the NVM device NVM11 from the NVM devices NVM11 to NVM1n connected to the first channel CH1. The memory controller 16 may transmit the command CMDa, the address ADDRa, and the data DATAa to the selected NVM device NVM11 through the first channel CH1 or receive the data DATAa from the selected NVM device NVM11.

The memory controller 16 may transmit and receive signals to and from the memory device 17 in parallel through different channels. For example, the memory controller 16 may transmit a command CMDb to the memory device 17 through the second channel CH2 while transmitting a command CMDa to the memory device 17 through the first channel CH1. For example, the memory controller 16 may receive data DATAb from the memory device 17 through the second channel CH2 while receiving data DATAa from the memory device 17 through the first channel CH1.

The memory controller 16 may control all operations of the memory device 17. The memory controller 16 may transmit a signal to the channels CH1 to CHm and control each of the NVM devices NVM11 to NVMmn connected to the channels CH1 to CHm. For instance, the memory controller 16 may transmit the command CMDa and the address ADDRa to the first channel CH1 and control one selected from the NVM devices NVM 11 to NVM1n.

Each of the NVM devices NVM11 to NVMmn may operate via the control of the memory controller 16. For example, the NVM device NVM11 may program the data DATAa based on the command CMDa, the address ADDRa, and the data DATAa provided to the first channel CH1. For example, the NVM device NVM21 may read the data DATAb based on the command CMDb and the address ADDb provided to the second channel CH2 and transmit the read data DATAb to the memory controller 16.

Although FIG. 3 illustrates an example in which the memory device 17 communicates with the memory controller 16 through m channels and includes n NVM devices corresponding to each of the channels, the number of channels and the number of NVM devices connected to one channel may be variously changed.

Figure 4:
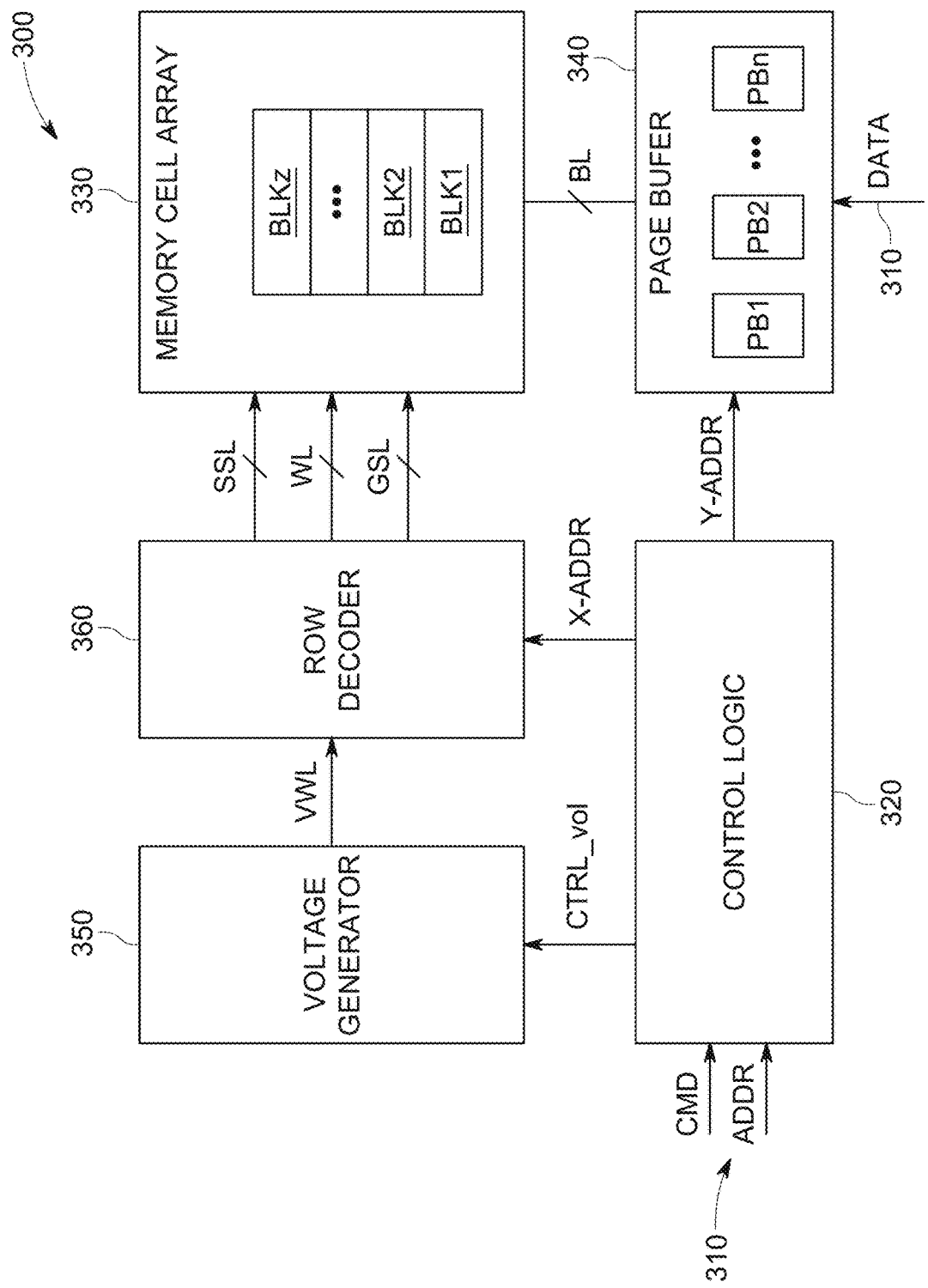
FIG. 4 is a block diagram of a memory device, according to embodiments.

FIG. 4 is a block diagram of a memory device 300 according to an example embodiment. Referring to FIG. 4, the memory device 300 may include a control logic circuitry 320, a memory cell array 330, a page buffer 340, a voltage generator 350, and a row decoder 360. Although not shown in FIG. 4, the memory device 300 may further include a memory interface circuitry 310 shown in FIG. 6. In addition, the memory device 300 may further include a column logic, a pre-decoder, a temperature sensor, a command decoder, and/or an address decoder.

The control logic circuitry 320 may control all various operations of the memory device 300. The control logic circuitry 320 may output various control signals in response to commands CMD and/or addresses ADDR from the memory interface circuitry 310. For example, the control logic circuitry 320 may output a voltage control signal CTRL_vol, a row address X-ADDR, and a column address Y-ADDR.

The memory cell array 330 may include a plurality of memory blocks BLK1 to BLKz (here, z is a positive integer), each of which may include a plurality of memory cells. The memory cell array 330 may be connected to the page buffer 340 through bit lines BL and be connected to the row decoder 360 through word lines WL, string selection lines SSL, and ground selection lines GSL.

In an example embodiment, the memory cell array 330 may include a 3D memory cell array, which includes a plurality of NAND strings. Each of the NAND strings may include memory cells respectively connected to word lines vertically stacked on a substrate. The disclosures of U.S. Pat. Nos. 7,679,133; 8,553,466; 8,654,587; 8,559,235; and US Pat. Pub. No. 2011/0233648 are hereby incorporated by reference. In an example embodiment, the memory cell array 330 may include a 2D memory cell array, which includes a plurality of NAND strings arranged in a row direction and a column direction.

The page buffer 340 may include a plurality of page buffers PB1 to PBn (here, n is an integer greater than or equal to 3), which may be respectively connected to the memory cells through a plurality of bit lines BL. The page buffer 340 may select at least one of the bit lines BL in response to the column address Y-ADDR. The page buffer 340 may operate as a write driver or a sense amplifier according to an operation mode. For example, during a program operation, the page buffer 340 may apply a bit line voltage corresponding to data to be programmed, to the selected bit line. During a read operation, the page buffer 340 may sense current or a voltage of the selected bit line BL and sense data stored in the memory cell.

The voltage generator 350 may generate various kinds of voltages for program, read, and erase operations based on the voltage control signal CTRL_vol. For example, the voltage generator 350 may generate a program voltage, a read voltage, a program verification voltage, and an erase voltage as a word line voltage VWL.

The row decoder 360 may select one of a plurality of word lines WL and select one of a plurality of string selection lines SSL in response to the row address X-ADDR. For example, the row decoder 360 may apply the program voltage and the program verification voltage to the selected word line WL during a program operation and apply the read voltage to the selected word line WL during a read operation.

Figure 5:
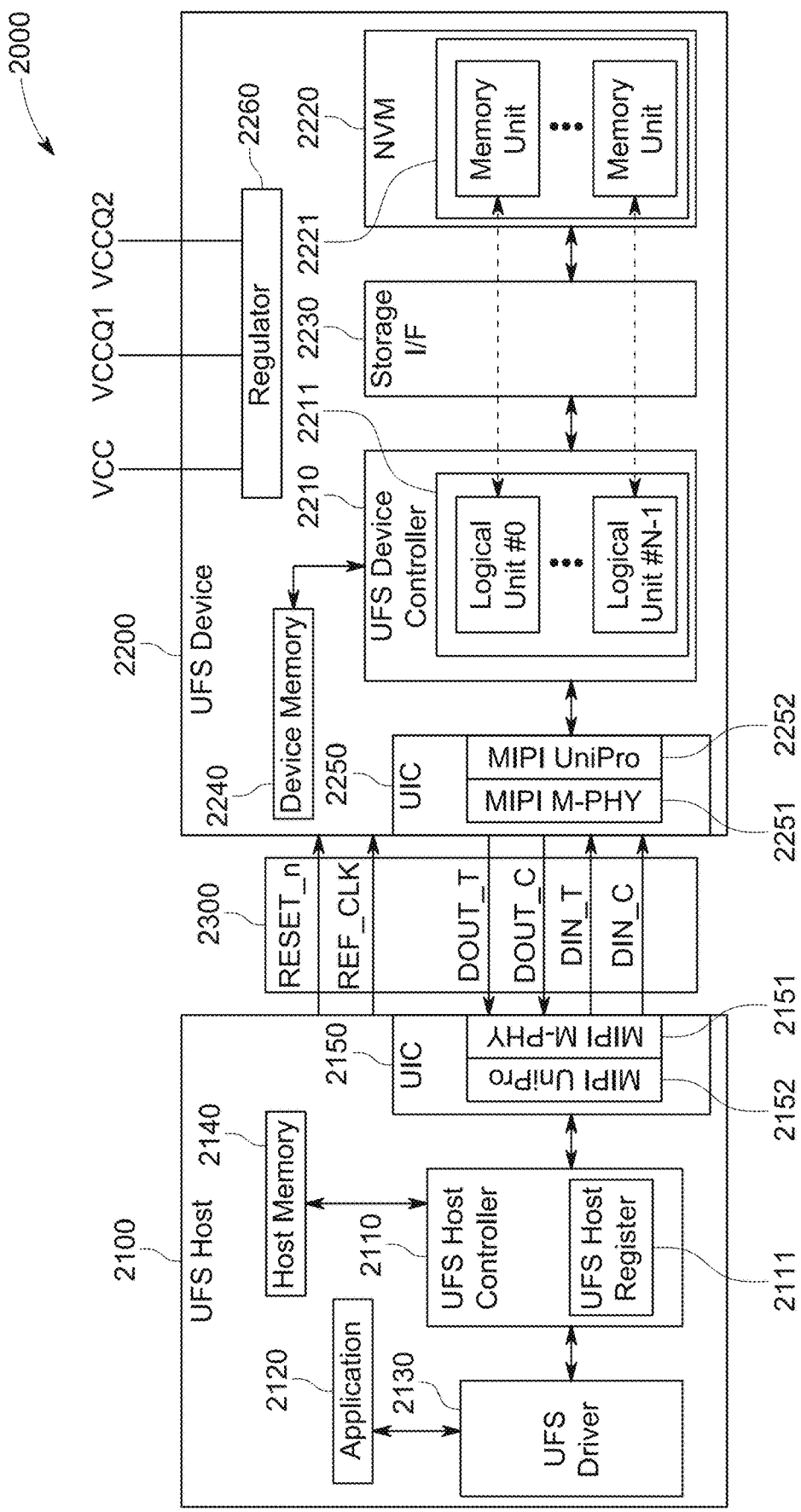
FIG. 5 is a block diagram of a UFS system, according to embodiments.

FIG. 5 is a diagram of a UFS system 2000 according to embodiments. The UFS system 2000 may be a system conforming to a UFS standard announced by Joint Electron Device Engineering Council (JEDEC) and include a UFS host 2100, a UFS device 2200, and a UFS interface 2300. The above description of the system 1000 of FIG. 1 may also be applied to the UFS system 2000 of FIG. 5 within a range that does not conflict with the following description of FIG. 5.

Referring to FIG. 5, the UFS host 2100 may be connected to the UFS device 2200 through the UFS interface 2300. When the main processor 1100 of FIG. 1 is an AP, the UFS host 2100 may be implemented as a portion of the AP. The UFS host controller 2110 and the host memory 2140 may respectively correspond to the controller 1120 of the main processor 1100 and the memories 1200a and 1200b of FIG. 1. The UFS device 2200 may correspond to the storage device 1300a and 1300b of FIG. 1, and a UFS device controller 2210 and an NVM 2220 may respectively correspond to the storage controllers 1310a and 1310b and the NVMs 1320a and 1320b of FIG. 1.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that wants to communicate with the UFS device 2200 to use functions of the UFS device 2200. The application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands. Although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_t and DIN_c, and a pair of lines configured to transmit a pair of differential output signals DOUT_t and DOUT_c.

A frequency of a reference clock signal REF_CLK provided from the UFS host 2100 to the UFS device 2200 may be one of 19.2 MHz, 26 MHz, 38.4 MHz, and 52 MHz, without being limited thereto. The UFS host 2100 may change the frequency of the reference clock signal REF_CLK during an operation, that is, during data transmission/receiving operations between the UFS host 2100 and the UFS device 2200. The UFS device 2200 may generate cock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 5, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 5, the number of transmission lanes and the number of receiving lanes may be changed.

The receiving lane and the transmission lane may transmit data based on a serial communication scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may transmit data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be transmitted through the same lane. Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may control all operations of the UFS device 2200. The UFS device controller 2210 may manage the NVM 2220 by using a logical unit (LU) 2211, which is a logical data storage unit. The number of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size in a predetermined range. For example, a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As an example, when the UFS host 2100 intends to store user data in the UFS device 2200, the UFS host 2100 may transmit a data storage command to the UFS device 2200. When a response (a 'ready-to-transfer' response) indicating that the UFS host 2100 is ready to receive user data (ready-to-transfer) is received from the UFS device 2200, the UFS host 2100 may transmit user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

As another example, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine (not shown) embedded therein. More specifically, the ECC engine may generate parity bits for write data to be written to the NVM 2220, and the generated parity bits may be stored in the NVM 2220 along with the write data. During the reading of data from the NVM 2220, the ECC engine may correct an error in read data by using the parity bits read from the NVM 2220 along with the read data, and output error-corrected read data.

In addition, the UFS device controller 2210 may transmit user data, which is temporarily stored in the device memory 2240, to the UFS host 2100. In addition, the UFS device controller 2210 may further include an AES engine (not shown). The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive a next command from the UFS host 2100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 2221 may include a memory cell array (not shown) and a control circuit (not shown) configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 2200. The voltage VCC may be a main power supply voltage for the UFS device 2200 and be in a range of 2.4 V to 3.6 V. The voltage VCCQ may be a power supply voltage for supplying a low voltage mainly to the UFS device controller 2210 and be in a range of 1.14 V to 1.26 V. The voltage VCCQ2 may be a power supply voltage for supplying a voltage, which is lower than the voltage VCC and higher than the voltage VCCQ, mainly to an I/O interface, such as the MIPI M-PHY 2251, and be in a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

Figure 6:
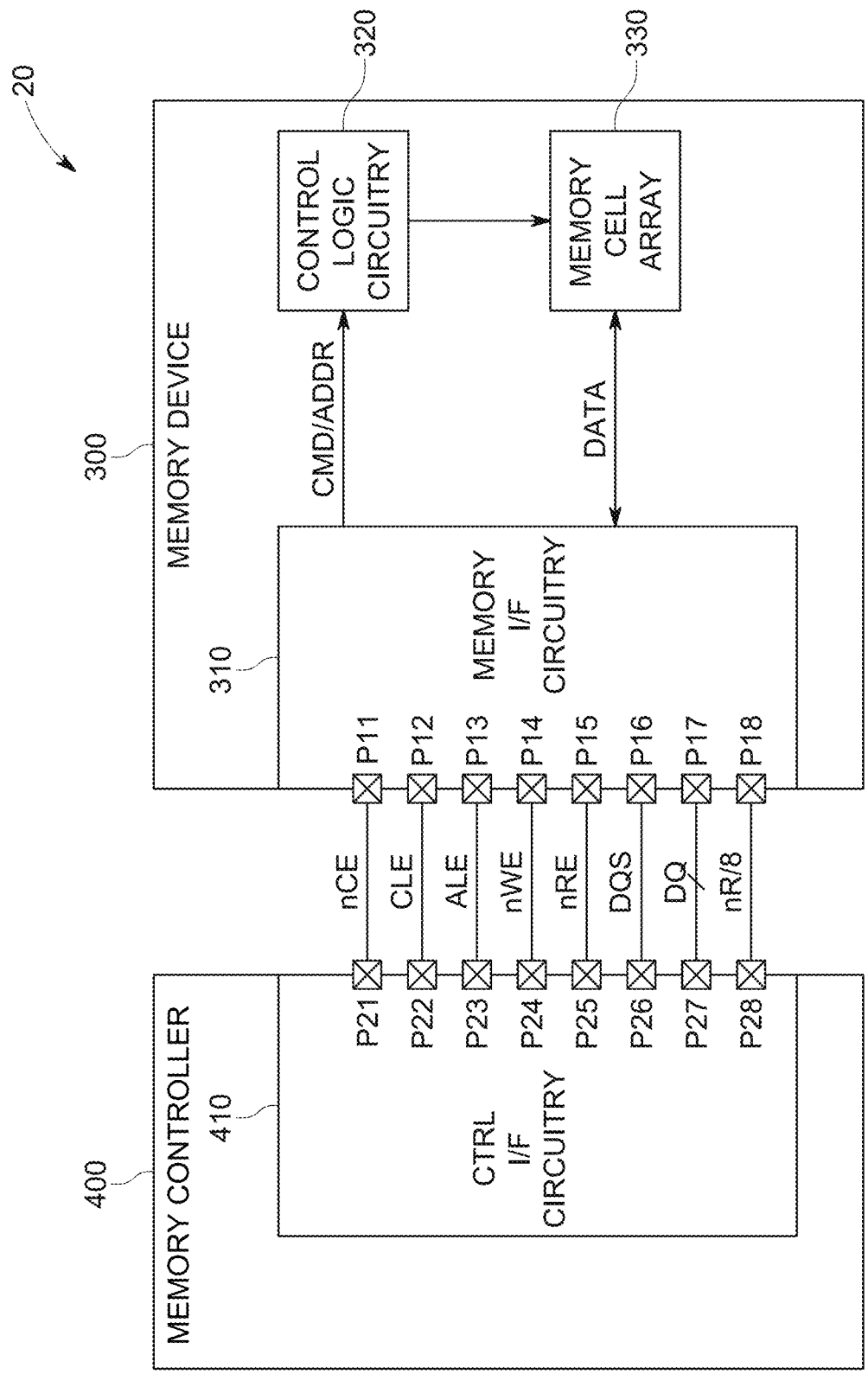
FIG. 6 is a block diagram of a memory system, according to embodiments.

FIG. 6 is a block diagram of a memory system 20 according to embodiments. Referring to FIG. 6, the memory system 20 may include a memory device 300 and a memory controller 400. The memory device 300 may correspond to one of NVM devices NVM11 to NVMmn, which communicate with a memory controller 200 based on one of the plurality of channels CH1 to CHm of FIG. 3. The memory controller 400 may correspond to the memory controller 200 of FIG. 3.

The memory device 300 may include first to eighth pins P11 to P18, a memory interface circuitry 310, a control logic circuitry 320, and a memory cell array 330.

The memory interface circuitry 310 may receive a chip enable signal nCE from the memory controller 400 through the first pin P11. The memory interface circuitry 310 may transmit and receive signals to and from the memory controller 400 through the second to eighth pins P12 to P18 in response to the chip enable signal nCE. For example, when the chip enable signal nCE is in an enable state (e.g., a low level), the memory interface circuitry 310 may transmit and receive signals to and from the memory controller 400 through the second to eighth pins P12 to P18.

The memory interface circuitry 310 may receive a command latch enable signal CLE, an address latch enable signal ALE, and a write enable signal nWE from the memory controller 400 through the second to fourth pins P12 to P14. The memory interface circuitry 310 may receive a data signal DQ from the memory controller 400 through the seventh pin P17 or transmit the data signal DQ to the memory controller 400. A command CMD, an address ADDR, and data may be transmitted via the data signal DQ. For example, the data signal DQ may be transmitted through a plurality of data signal lines. In this case, the seventh pin P17 may include a plurality of pins respectively corresponding to a plurality of data signals DQ(s).

The memory interface circuitry 310 may obtain the command CMD from the data signal DQ, which is received in an enable section (e.g., a high-level state) of the command latch enable signal CLE based on toggle time points of the write enable signal nWE. The memory interface circuitry 310 may obtain the address ADDR from the data signal DQ, which is received in an enable section (e.g., a high-level state) of the address latch enable signal ALE based on the toggle time points of the write enable signal nWE.

In an example embodiment, the write enable signal nWE may be maintained at a static state (e.g., a high level or a low level) and toggle between the high level and the low level. For example, the write enable signal nWE may toggle in a section in which the command CMD or the address ADDR is transmitted. Thus, the memory interface circuitry 310 may obtain the command CMD or the address ADDR based on toggle time points of the write enable signal nWE.

The memory interface circuitry 310 may receive a read enable signal nRE from the memory controller 400 through the fifth pin P15. The memory interface circuitry 310 may receive a data strobe signal DQS from the memory controller 400 through the sixth pin P16 or transmit the data strobe signal DQS to the memory controller 400.

In a data (DATA) output operation of the memory device 300, the memory interface circuitry 310 may receive the read enable signal nRE, which toggles through the fifth pin P15, before outputting the data DATA. The memory interface circuitry 310 may generate the data strobe signal DQS, which toggles based on the toggling of the read enable signal nRE. For example, the memory interface circuitry 310 may generate a data strobe signal DQS, which starts toggling after a predetermined delay (e.g., tDQSRE), based on a toggling start time of the read enable signal nRE. The memory interface circuitry 310 may transmit the data signal DQ including the data DATA based on a toggle time point of the data strobe signal DQS. Thus, the data DATA may be aligned with the toggle time point of the data strobe signal DQS and transmitted to the memory controller 400.

In a data (DATA) input operation of the memory device 300, when the data signal DQ including the data DATA is received from the memory controller 400, the memory interface circuitry 310 may receive the data strobe signal DQS, which toggles, along with the data DATA from the memory controller 400. The memory interface circuitry 310 may obtain the data DATA from the data signal DQ based on toggle time points of the data strobe signal DQS. For example, the memory interface circuitry 310 may sample the data signal DQ at rising and falling edges of the data strobe signal DQS and obtain the data DATA.

The memory interface circuitry 310 may transmit a ready/busy output signal nR/B to the memory controller 400 through the eighth pin P18. The memory interface circuitry 310 may transmit state information of the memory device 300 through the ready/busy output signal nR/B to the memory controller 400. When the memory device 300 is in a busy state (i.e., when operations are being performed in the memory device 300), the memory interface circuitry 310 may transmit a ready/busy output signal nR/B indicating the busy state to the memory controller 400. When the memory device 300 is in a ready state (i.e., when operations are not performed or completed in the memory device 300), the memory interface circuitry 310 may transmit a ready/busy output signal nR/B indicating the ready state to the memory controller 400. For example, while the memory device 300 is reading data DATA from the memory cell array 330 in response to a page read command, the memory interface circuitry 310 may transmit a ready/busy output signal nR/B indicating a busy state (e.g., a low level) to the memory controller 400. For example, while the memory device 300 is programming data DATA to the memory cell array 330 in response to a program command, the memory interface circuitry 310 may transmit a ready/busy output signal nR/B indicating the busy state to the memory controller 400.

The control logic circuitry 320 may control all operations of the memory device 300. The control logic circuitry 320 may receive the command/address CMD/ADDR obtained from the memory interface circuitry 310. The control logic circuitry 320 may generate control signals for controlling other components of the memory device 300 in response to the received command/address CMD/ADDR. For example, the control logic circuitry 320 may generate various control signals for programming data DATA to the memory cell array 330 or reading the data DATA from the memory cell array 330.

The memory cell array 330 may store the data DATA obtained from the memory interface circuitry 310, via the control of the control logic circuitry 320. The memory cell array 330 may output the stored data DATA to the memory interface circuitry 310 via the control of the control logic circuitry 320.

The memory cell array 330 may include a plurality of memory cells. For example, the plurality of memory cells may be flash memory cells. However, the inventive concept is not limited thereto, and the memory cells may be RRAM cells, FRAM cells, PRAM cells, thyristor RAM (TRAM) cells, or MRAM cells. Hereinafter, an embodiment in which the memory cells are NAND flash memory cells will mainly be described.

The memory controller 400 may include first to eighth pins P21 to P28 and a controller interface circuitry 410. The first to eighth pins P21 to P28 may respectively correspond to the first to eighth pins P11 to P18 of the memory device 300.

The controller interface circuitry 410 may transmit a chip enable signal nCE to the memory device 300 through the first pin P21. The controller interface circuitry 410 may transmit and receive signals to and from the memory device 300, which is selected by the chip enable signal nCE, through the second to eighth pins P22 to P28.

The controller interface circuitry 410 may transmit the command latch enable signal CLE, the address latch enable signal ALE, and the write enable signal nWE to the memory device 300 through the second to fourth pins P22 to P24. The controller interface circuitry 410 may transmit or receive the data signal DQ to and from the memory device 300 through the seventh pin P27.

The controller interface circuitry 410 may transmit the data signal DQ including the command CMD or the address ADDR to the memory device 300 along with the write enable signal nWE, which toggles. The controller interface circuitry 410 may transmit the data signal DQ including the command CMD to the memory device 300 by transmitting a command latch enable signal CLE having an enable state. Also, the controller interface circuitry 410 may transmit the data signal DQ including the address ADDR to the memory device 300 by transmitting an address latch enable signal ALE having an enable state.

The controller interface circuitry 410 may transmit the read enable signal nRE to the memory device 300 through the fifth pin P25. The controller interface circuitry 410 may receive or transmit the data strobe signal DQS from or to the memory device 300 through the sixth pin P26.

In a data (DATA) output operation of the memory device 300, the controller interface circuitry 410 may generate a read enable signal nRE, which toggles, and transmit the read enable signal nRE to the memory device 300. For example, before outputting data DATA, the controller interface circuitry 410 may generate a read enable signal nRE, which is changed from a static state (e.g., a high level or a low level) to a toggling state. Thus, the memory device 300 may generate a data strobe signal DQS, which toggles, based on the read enable signal nRE. The controller interface circuitry 410 may receive the data signal DQ including the data DATA along with the data strobe signal DQS, which toggles, from the memory device 300. The controller interface circuitry 410 may obtain the data DATA from the data signal DQ based on a toggle time point of the data strobe signal DQS.

In a data (DATA) input operation of the memory device 300, the controller interface circuitry 410 may generate a data strobe signal DQS, which toggles. For example, before transmitting data DATA, the controller interface circuitry 410 may generate a data strobe signal DQS, which is changed from a static state (e.g., a high level or a low level) to a toggling state. The controller interface circuitry 410 may transmit the data signal DQ including the data DATA to the memory device 300 based on toggle time points of the data strobe signal DQS.

The controller interface circuitry 410 may receive a ready/busy output signal nR/B from the memory device 300 through the eighth pin P28. The controller interface circuitry 410 may determine state information of the memory device 300 based on the ready/busy output signal nR/B.

Figure 7:
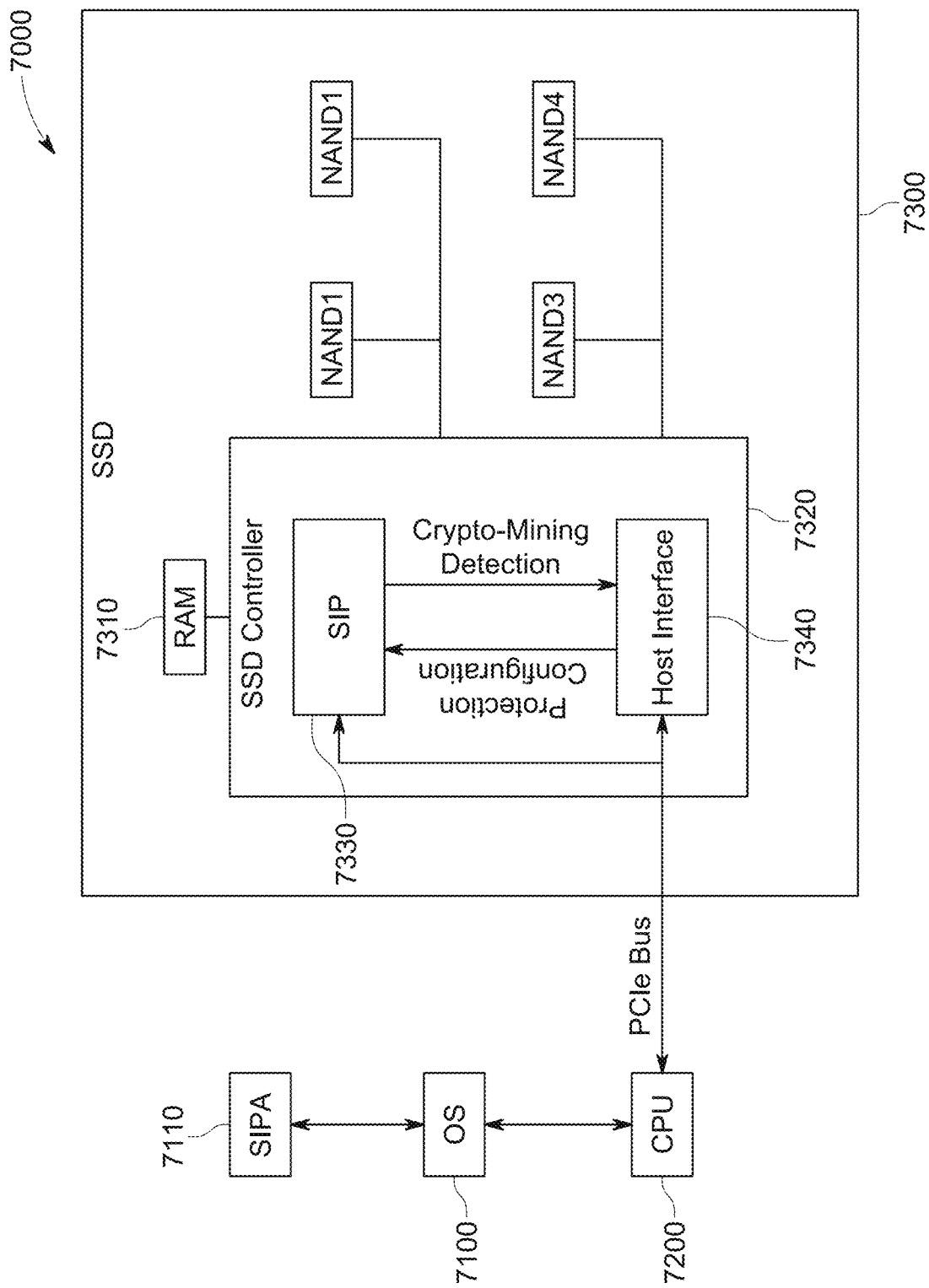
FIG. 7 is a block diagram of a storage system, according to embodiments.

FIG. 7 is an example of a storage system 7000, according to embodiments. The storage system 7000 may include a CPU 7200 which may be used to operate an operating system (OS) 7100, and may include an SSD 7300. In embodiments, the CPU 7200 may correspond to, for example, the main processor 1100, the CPU core 1110, the host controller 110, the UFS host controller 2110, or any other element discussed above. In embodiments, the SSD 7300 may correspond to the storage devices 1300a and 1300b, the storage device 200, the memory system 15, the memory system 20, or any other element discussed above. Although the SSD 7300 is illustrated as an SSD, embodiments may also be applied to any other type of storage device, for example a UFS storage device such as the UFS device 2200, or any other storage device such as an eMMC storage device. In embodiments, the CPU 7200 may communicate with a storage device, for example the SSD 7300, using a communication pathway such as a PCIe bus, however embodiments are not limited thereto, and CPU 7200 may communicate with any type of storage device over any type of connection.

The SSD 7300 may include a RAM 7310, an SSD controller 7320, and one or more memory devices such as NAND flash memory devices NAND1, NAND2, NAND3, and NAND4. In embodiments, the RAM 7310 may correspond to the buffer memory 216, the device memory 2240, or any other element discussed above. In embodiments, the SSD controller 7320 may correspond to the STRG CTRL 1310a and 1310b, the STRG CTRL 210, memory controller 16, the UFS device controller 2210, the memory controller 400, or any other element described above. In embodiments, the memory devices NAND1, NAND2, NAND3, and NAND4 may correspond to the NVMs 1320a and 1320b, the NVM 220, the NVM devices NVM11-NVMmn, the memory device 300, the NVM 2220, or any other element described above.

In embodiments, the SSD controller 7320 may include a storage internal protection (SIP) module 7330 and a host interface 7340, however embodiments are not limited thereto. In embodiments, the SIP module 7330 may be implemented by a hardware included in the SSD controller 7320. In embodiments, the hardware may include at least one processor, however embodiments are not limited thereto. For example, the the SIP module 7330 may be implemented using other types of hardware, for example using a circuit such as an application-specific integrated circuit (ASIC) or other hardware. In embodiments, one or more of the SIP module 7330 and the host interface 7340 may be implemented separately from the SSD controller 7320. In embodiments, the host interface 7340 may correspond to the host I/F 211, the UIC 2250, or any other element discussed above.

In embodiments, the SIP 7330 may be used to provide protection from malicious crypto-mining and cryptojacking attacks.

In embodiments, all of the storage commands, which may be for example NVMe commands, which are passed from the CPU 7200 to the host interface 7340 may be sniffed and processed in the SIP module 7330 in parallel to their processing in the host interface 7340. In embodiments, the SIP module 7330 may sniff the NVMe communication and detect crypto-mining activity. The SIP module 7330 may generate an alert or notification which may be provided to the CPU 7200. Although FIG. 7 shows the SIP 7330 as being included in the SSD 7300, embodiments are not limited thereto, and SIP 7330 may be included in any type of storage device.

In embodiments, a user of the CPU 7200 may receive the alert or notification, or information about the alert or notification, through a Storage Internal Protection Application (SIPA) 7110. In embodiments, the SIPA 7110 may also allow the user to configure or otherwise modify an operation of the SIP 7330. For example, using the SIPA 7110, the user may specify types or amounts of cryptocurrencies or crypto-mining operations that are allowed using the storage system 7000, if any, and may specify types or amounts of cryptocurrencies or crypto-mining operations which may not be allowed using the storage system 7000, and which therefore may cause an alert or notification to be triggered. In embodiments, an alert or notification may be triggered for both malicious crypto-mining and legitimate crypto-mining, in order to provide the user with information regarding a health of the storage system 7000 or the SSD 7300.

In embodiments, one or both of the SIP module 7330 and the SIPA 7110 may allow the user or owner of the storage system 7000 or SSD 7300 to avoid malicious crypto-mining activity, and to therefore avoid loss of storage space and multiple P/E cycles that degrade the health of the device.

In embodiments, the SIP module 7330 may detect the crypto-mining activity using metadata of the storage commands, which may be for example NVMe commands. For example, the SIP module 7330 may analyze an operation code (opcode) of one or more commands, a starting logical block address (SLBA) of one or more storage commands, a number of logical blocks (NLB) corresponding to one or more storage commands, and a queue identifier (QID) of one or more storage commands.

Figure 8:
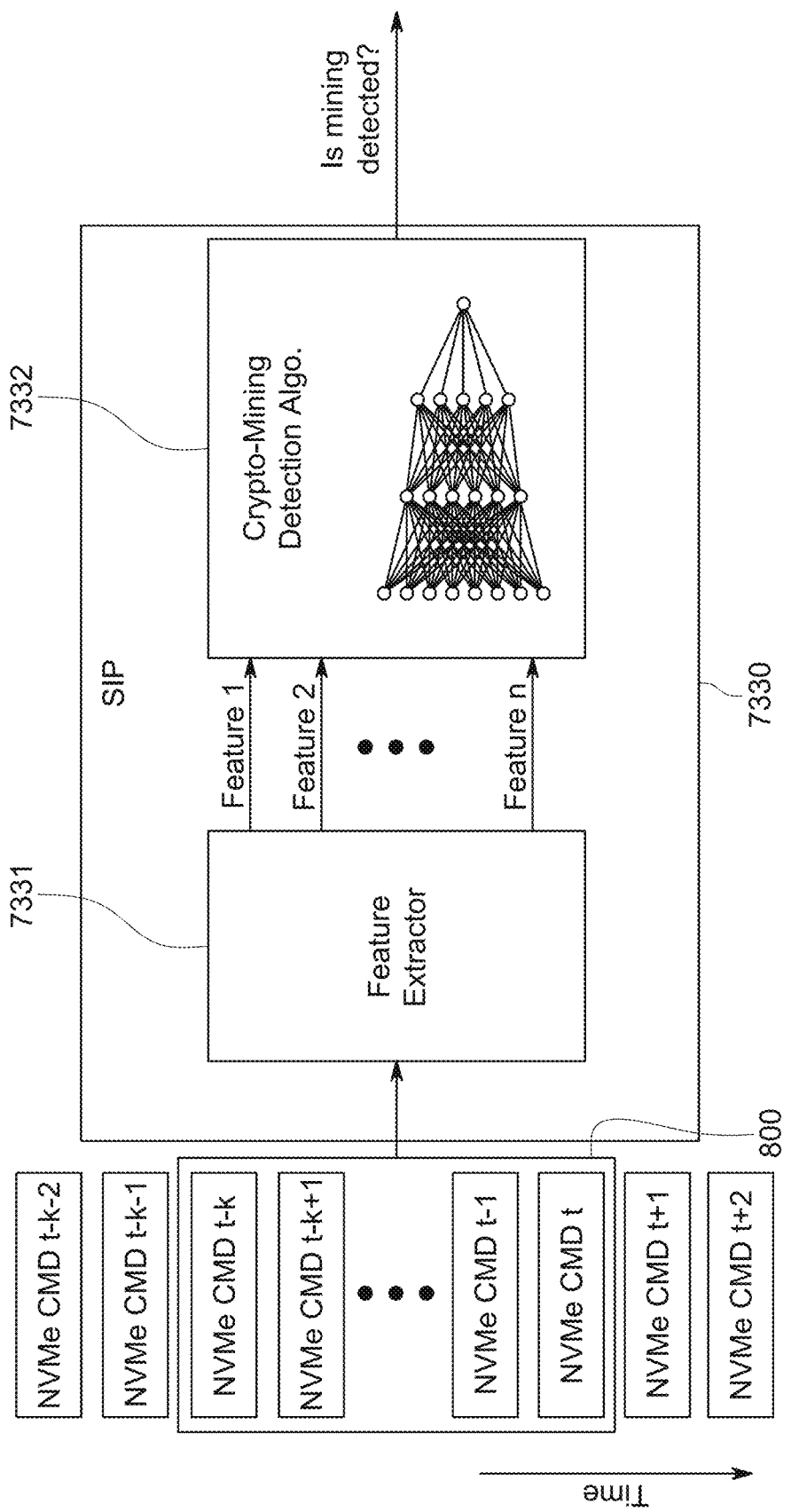
FIG. 8 is a block diagram of a logical flow of a crypto-mining detection system, according to embodiments.

FIG. 8 shows an example of a logical flow of a crypto-mining detection mechanism used by the SIP module 7330, according to embodiments. In embodiments, the SIP module 7330 may include a feature extractor 7331, which may receive a plurality of storage commands and provide a plurality of extracted features to a crypto-mining detection algorithm 7332. In embodiments, the feature extractor 7331 may take as input a sequence of the recent commands included in a sliding window of the overall received storage commands. For example the SIP module 7330 may receive a plurality of NVMe commands, which may be for example a stream of NVMe commands including NVMe CMD t−k−2 through NVMe CMD t+2. A sliding window 800 of commands, which for example at time t may include all commands from NVMe CMD t−k through NVMe CMD t, may be provided as input to the feature extractor 7331. Accordingly, the feature extractor 7331 may extract features such as Feature 1 through Feature n to be used as input by the crypto-mining detection algorithm 7332. In embodiments, the feature extractor 7331 may perform additional filtering. For example, based on metadata of the plurality of NVMe commands, the feature extractor may only extract features of NVMe commands having an opcode indicating a particular type of command, or NVMe commands associated with an NLB that is larger than or smaller than a predetermined threshold. In embodiments, the feature extractor 7331 may receive all of the NVMe commands and may perform filtering on all of the NVMe commands, or may apply the sliding window and/or provide additional filtering on the NVMe commands.

In embodiments, the feature extractor 7331 may extract features which may be relevant to crypto-mining activity detection. Such features may include, for example, one or more of an SLBA range, which may be a difference between a smallest SLBA and a largest SLBA, a percentage of read commands vs. write commands, a range of NLBs, and QIDs of different commands. In embodiments, the feature extractor 7331 may perform feature extraction on blocks of commands, or individual commands (which may mean for example that the sliding window 800 may be a single command). In embodiments, the features which are extracted using feature extractor 7331 may relate to time differences between commands, frequencies appearing in the commands included in the sliding window 800 (for example SLBAs appearing in the sliding window 800 and NLBs appearing in the sliding window 800).

In embodiments, the crypto-mining detection algorithm 7332 may be a machine learning crypto-mining detection algorithm which may be trained to receive a plurality of features and output a binary result, for example a signal indicating whether crypto-mining detected or not. In embodiments, the crypto-mining detection algorithm 7332 may include a neural network. In embodiments, the neural network may include at least one from among a convolutional neural network (CNN), a recurrent neural network (RNN), a classical algorithm such as a principle component analysis model, a random forests model, and an algorithm for one class classification. However, embodiments are not limited thereto, and the crypto-mining detection algorithm 7332 may include any other type of algorithm.

In embodiments, the crypto-mining detection algorithm 7332 may decide whether crypto-mining activity is detected or not, based on its internal memory and the set of features extracted from the storage commands that are currently inside the sliding window 800, and may provide an indication which may be used to generate an alert or notification.

Figure 9:
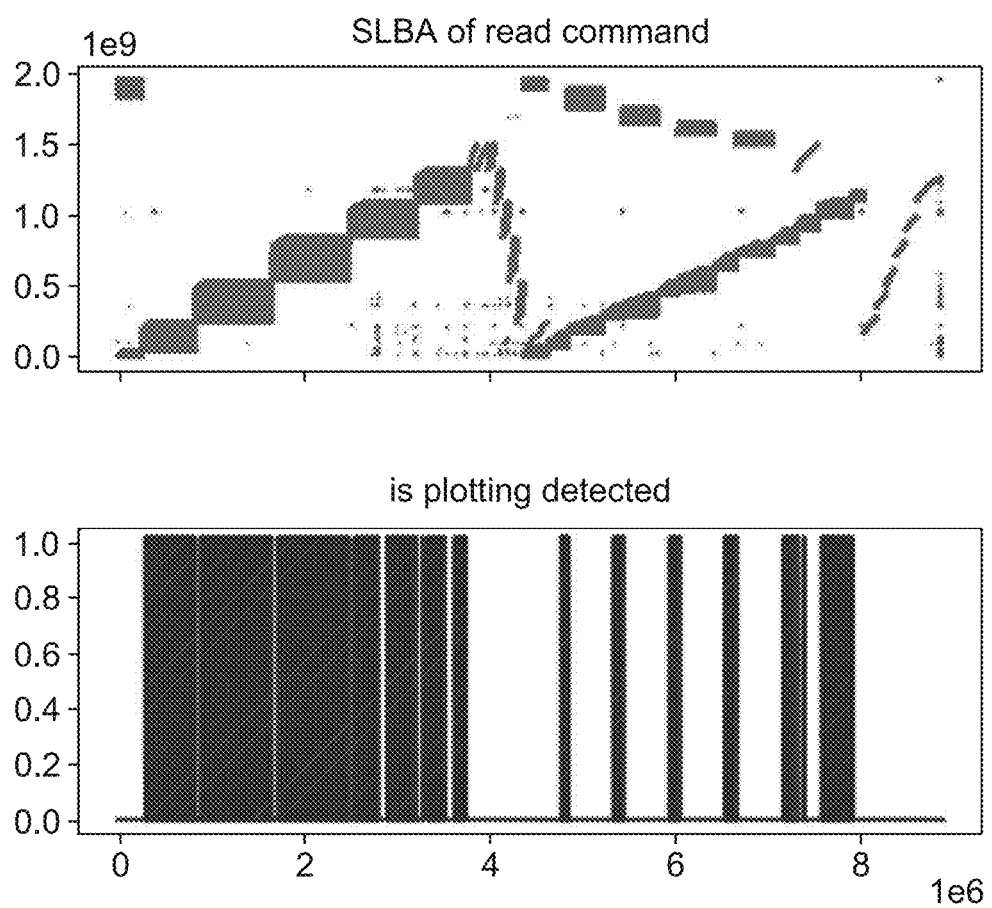
FIG. 9 illustrates example results of crypto-mining detection, according to embodiments.

FIG. 9 demonstrates a result of a detection of plotting, which may be an initial stage of Chia mining or farming, using SIP module 7330 according to embodiments. In embodiments, the SIP module 7330 may receive a plurality of NVMe commands, and may provide the NVMe commands included in the sliding window 800 to the feature extractor 7331. The feature extractor 7331 may filter the plurality of NVMe commands included in the sliding window 800 to obtain all read commands included in the sliding window 800 which have an NLB above a predetermined threshold, and may obtain the SLBAs corresponding to the filtered commands and provide the SLBAs to the crypto-mining detection algorithm 7332. Based on the SLBAs, the crypto-mining detection algorithm 7332 may provide a signal indicating whether crypto-mining is detected or not.

As illustrated in FIG. 9, the top graph shows the SLBA field of the NVMe read commands, wherein the y-axis shown the address indicated by the SLBA, and the x-axis is the command axis, every command is indicated by a dot. As illustrated in FIG. 9, the bottom graph shows an example output of the crypto-mining detection algorithm 7332 run on those commands, according to embodiments.

In accordance with embodiments discussed above, an internal protection logical block, which may correspond to the SIP 7330, may be added to a storage device such as the SSD 7300. In embodiments, this internal protection logical block may have full access to NVMe commands and storage commands. Accordingly, this internal protection logical block may be implemented as an independent hardware, or as part of the host interface logic such as host interface 7340, as part of a storage controller such as the SSD controller 7320, or included in any other element as desired.

In addition, an internal protection application, for example the SIPA 7110, maybe a software package installed to interact with the user, and may allow configuration of the SIP 7330 and popping alerts when suspicious activity is detected. The SIPA 7110 may, for example, be integrated as part of Samsung Magician Software for monitoring Samsung SSDs.

Although embodiments discussed above relate to providing notification of crypto-mining activity detection, embodiments are not limited thereto. For example, embodiments detect ransomware activity and allow blocking of this ransomware activity. Embodiments identify each storage command as legitimate or malicious. This identification may be provided to the SIPA 7110, and/or may be provided to an element within the storage device 7000, for example SSD controller 7320. Accordingly, the malicious storage commands may be simply ignored by the storage device 7000, effectively stopping the malicious activity at the storage device level. In order to accomplish this identification, the crypto-mining detection algorithm may, forecast an expected next storage command, and provide the identification based on the forecast. For example, the crypto-mining detection algorithm may forecast an expected next storage command by determining a next storage command which would be consistent with or expected in malicious activity such as crypto-jacking, and may provide the identification if the actual next storage command matches with or corresponds to the forecasted next storage command. In addition, embodiments may transmit to the SIPA 7110 information that assists in identifying an application or file which is responsible for malicious commands, so that the application or file can be isolated in the software layer. For example, the SIPA 7110 maybe able to monitor storage access, monitor RAM usage, detect applications that are being used, monitor application usage and OS Application Programming Interface (API) usage, and other information that may be difficult or impossible for the SIP module 7330 to access, and may identify malicious applications or files based on this information and information provided by the SIP module 7330.

Figure 10:
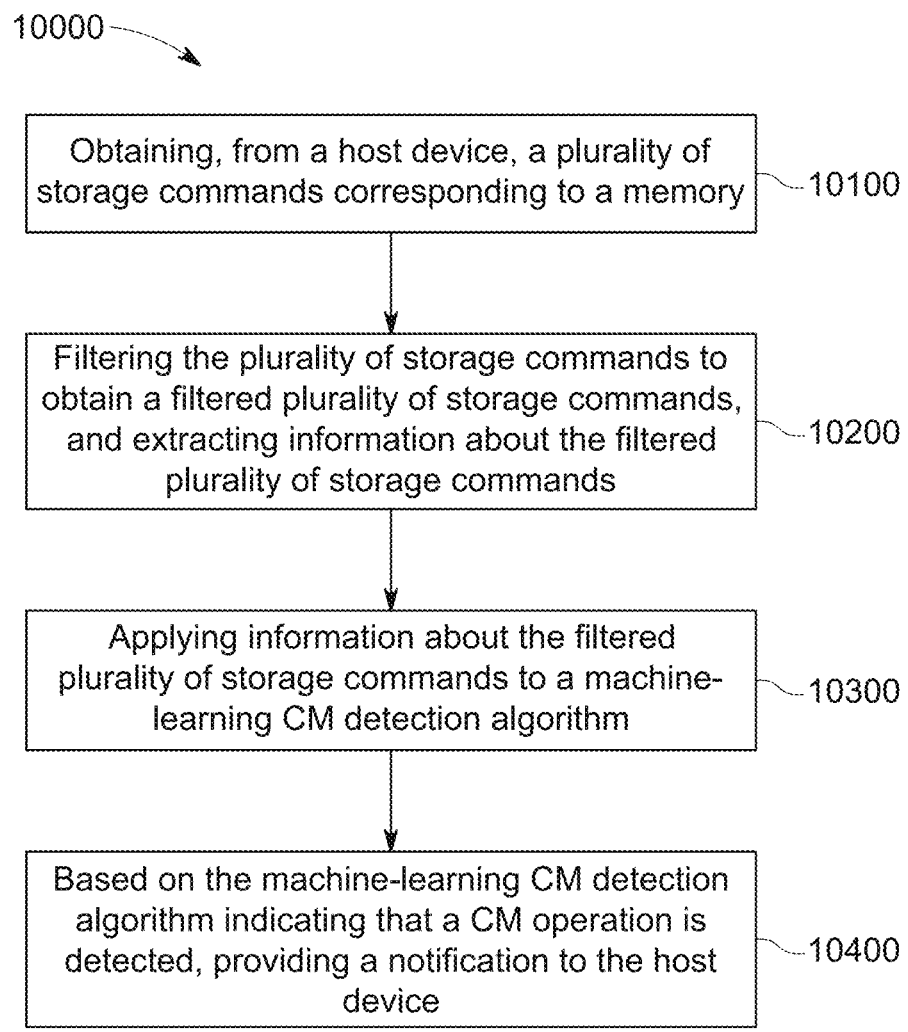
FIG. 10 is a flowchart of a process of controlling a storage system, according to embodiments.

FIG. 10 is a flowchart of a process 10000 of controlling a storage device, according to embodiments. In some implementations, one or more process blocks of FIG. 10 may be performed by the SIP module 7330 or any other element described above with reference to FIGS. 1-9.

As shown in FIG. 10, at operation 10100 the process 10000 may include obtaining, from a host device, a plurality of storage commands corresponding to a memory. In embodiments, the host device may correspond to the CPU 7200, the host 100, the UFS host 2100, or any other element described above with reference to FIGS. 1-9. In embodiments, the memory may be a nonvolatile memory. In embodiments, the memory may correspond to storage devices 1300a and 1300b, storage device 200, memory system 15, memory system 20, SSD 7300, storage device 3250, or any memory device or storage device described above.

As further shown in FIG. 10, at operation 10200 the process 10000 may include filtering the plurality of storage commands to obtain a filtered plurality of storage commands, and extracting information about the filtered plurality of storage commands. In embodiments, the information about the filtered plurality of storage commands may include a plurality of features.

As further shown in FIG. 10, at operation 10300 the process 10000 may include applying information about the filtered plurality of storage commands to a machine-learning cyrpto-mining detection algorithm. In embodiments, the machine-learning cyrpto-mining detection algorithm may correspond to the crypto-mining detection algorithm 7332.

As further shown in FIG. 10, at operation 10400 the process 10000 may include, based on the machine-learning crypto-mining detection algorithm indicating that a crypto-mining operation is detected, providing a notification to the host device.

In embodiments, the storage device may include an SSD controller configured to receive the plurality of storage commands and perform operations on the memory based on the plurality of storage commands, wherein the SSD controller includes at least one processor which may implement the SIP module 7330, which may be configured to perform the process 10000. In embodiments, the process 10000 may be performed by hardware that is not a processor. For example, the SIP module 7330 may be implemented by a circuit or other hardware that does not include a processor, and the process 10000 may be performed by the SIP module 7330.

In embodiments, the plurality of storage commands may include at least one nonvolatile memory express (NVMe) command. However, embodiments are not limited thereto, and the storage commands may be any type of storage commands, or correspond to any command protocol.

In embodiments, the plurality of storage commands may be obtained based on a sliding window having a predetermined size.

In embodiments, the information about the filtered plurality of storage commands may be obtained by extracting a plurality of features from metadata corresponding to the plurality of storage commands.

In embodiments, a feature of the plurality of features may include at least one from among an operation code corresponding to a storage command from among the plurality of storage commands, a starting logical block address corresponding to the storage command, a number of logical blocks corresponding to the storage command, and a queue identifier corresponding to the storage command. However, embodiments are not limited thereto, and the plurality of features may include any other type of feature.

In embodiments, the plurality of storage commands may be filtered based on the extracted plurality of features, and the information about the filtered plurality of storage commands may include a filtered plurality of features corresponding to the filtered plurality of storage commands.

In embodiments, the machine-learning crypto-mining detection algorithm may include at least one from among a convolutional neural network, a recurrent neural network, a principal component analysis model, and a random forests model.

In embodiments, the machine-learning crypto-mining detection algorithm may be configured to identify the CM operation based on a pattern associated with the filtered plurality of storage commands, and the pattern may relate to at least one from among a plurality of memory addresses corresponding to the filtered plurality of storage commands, a change in the plurality of memory addresses, a number of logical blocks corresponding to the filtered plurality of storage commands, and a timing pattern of the plurality of storage commands.

In embodiments, the host device may be configured to operate a SIP application (SIPA) corresponding to the SIP module, and the process 10000 may further include providing an alert to a user of the host device based on the notification, and receiving a user input received from the user, and modifying an operation of the SIP module 7330 based on the user input. In embodiments, the SIPA may correspond to SIPA 7110.

Although FIG. 10 shows example blocks of process 10000, in some implementations, the process 10000 may include additional blocks, fewer blocks, different blocks, or differently arranged blocks than those depicted in FIG. 10. Additionally, or alternatively, two or more of the blocks of the process 10000 may be arranged or combined in any order, or performed in parallel.

Figure 11:
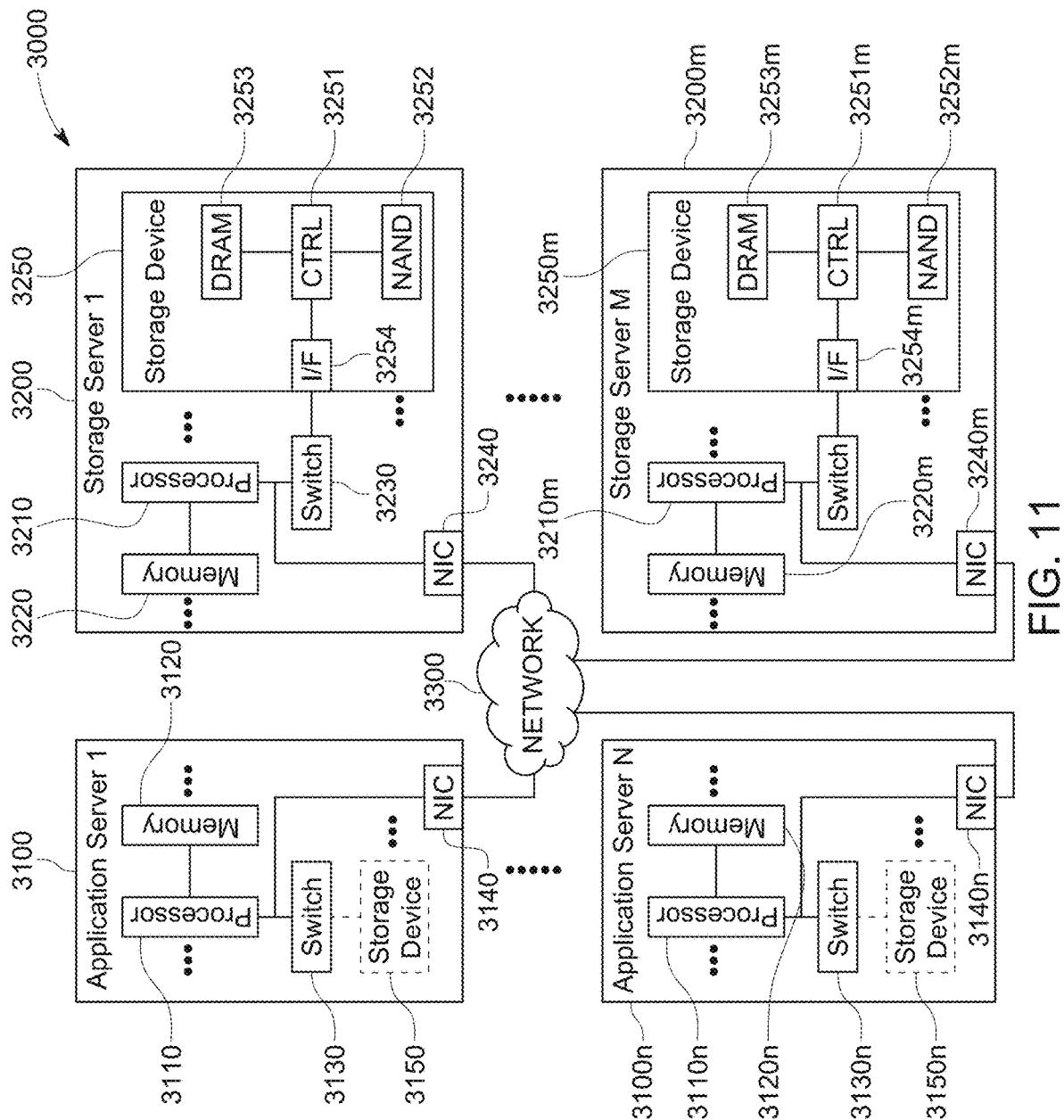
FIG. 11 is a block diagram of data center, according to embodiments.

FIG. 11 is a diagram of a data center 3000 to which a memory device is applied, according to embodiments.

Referring to FIG. 11, the data center 3000 may be a facility that collects various types of pieces of data and provides services and be referred to as a data storage center. The data center 3000 may be a system for operating a search engine and a database, and may be a computing system used by companies, such as banks, or government agencies. The data center 3000 may include application servers 3100 to 3100n and storage servers 3200 to 3200m. The number of application servers 3100 to 3100n and the number of storage servers 3200 to 3200m may be variously selected according to embodiments. The number of application servers 3100 to 3100n may be different from the number of storage servers 3200 to 3200m.

The application server 3100 or the storage server 3200 may include at least one of processors 3110 and 3210 and memories 3120 and 3220. The storage server 3200 will now be described as an example. The processor 3210 may control all operations of the storage server 3200, access the memory 3220, and execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some embodiments, the numbers of processors 3210 and memories 3220 included in the storage server 3200 may be variously selected. In embodiments, the processor 3210 and the memory 3220 may provide a processor-memory pair. In embodiments, the number of processors 3210 may be different from the number of memories 3220. The processor 3210 may include a single-core processor or a multi-core processor. The above description of the storage server 3200 may be similarly applied to the application server 3100. In some embodiments, the application server 3100 may not include a storage device 3150. The storage server 3200 may include at least one storage device 3250. The number of storage devices 3250 included in the storage server 3200 may be variously selected according to embodiments.

The application servers 3100 to 3100$n$ may communicate with the storage servers 3200 to 3200$m$ through a network 3300. The network 3300 may be implemented by using a fiber channel (FC) or Ethernet. In this case, the FC may be a medium used for relatively high-speed data transmission and use an optical switch with high performance and high availability. The storage servers 3200 to 3200$m$ may be provided as file storages, block storages, or object storages according to an access method of the network 3300.

In embodiments, the network 3300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another embodiment, the network 3300 may be a general network, such as a TCP/IP network. For example, the network 3300 may be implemented according to a protocol, such as FC over Ethernet (FCoE), network attached storage (NAS), and NVMe over Fabrics (NVMe-oF).

Hereinafter, the application server 3100 and the storage server 3200 will mainly be described. A description of the application server 3100 may be applied to another application server 3100$n$, and a description of the storage server 3200 may be applied to another storage server 3200$m$.

The application server 3100 may store data, which is requested by a user or a client to be stored, in one of the storage servers 3200 to 3200$m$ through the network 3300. Also, the application server 3100 may obtain data, which is requested by the user or the client to be read, from one of the storage servers 3200 to 3200$m$ through the network 3300. For example, the application server 3100 may be implemented as a web server or a database management system (DBMS).

The application server 3100 may access a memory 3120$n$ or a storage device 3150$n$, which is included in another application server 3100$n$, through the network 3300. Alternatively, the application server 3100 may access memories 3220 to 3220$m$ or storage devices 3250 to 3250$m$, which are included in the storage servers 3200 to 3200$m$, through the network 3300. Thus, the application server 3100 may perform various operations on data stored in application servers 3100 to 3100$n$ and/or the storage servers 3200 to 3200$m$. For example, the application server 3100 may execute an instruction for moving or copying data between the application servers 3100 to 3100$n$ and/or the storage servers 3200 to 3200$m$. In this case, the data maybe moved from the storage devices 3250 to 3250$m$ of the storage servers 3200 to 3200$m$ to the memories 3120 to 3120$n$ of the application servers 3100 to 3100$n$ directly or through the memories 3220 to 3220$m$ of the storage servers 3200 to 3200$m$. The data moved through the network 3300 may be data encrypted for security or privacy.

The storage server 3200 will now be described as an example. An interface 3254 may provide physical connection between a processor 3210 and a controller 3251 and a physical connection between a network interface card (NIC) 3240 and the controller 3251. For example, the interface 3254 may be implemented using a direct attached storage (DAS) scheme in which the storage device 3250 is directly connected with a dedicated cable. For example, the interface 3254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 3200 may further include a switch 3230 and the NIC(Network InterConnect) 3240. The switch 3230 may selectively connect the processor 3210 to the storage device 3250 or selectively connect the NIC 3240 to the storage device 3250 via the control of the processor 3210.

In embodiments, the NIC 3240 may include a network interface card and a network adaptor. The NIC 3240 may be connected to the network 3300 by a wired interface, a wireless interface, a Bluetooth interface, or an optical interface. The NIC 3240 may include an internal memory, a digital signal processor (DSP), and a host bus interface and be connected to the processor 3210 and/or the switch 3230 through the host bus interface. The host bus interface may be implemented as one of the above-described examples of the interface 3254. In embodiments, the NIC 3240 may be integrated with at least one of the processor 3210, the switch 3230, and the storage device 3250.

In the storage servers 3200 to 3200$m$ or the application servers 3100 to 3100$n$, a processor may transmit a command to storage devices 3150 to 3150$n$ and 3250 to 3250$m$ or the memories 3120 to 3120$n$ and 3220 to 3220$m$ and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 3150 to 3150$n$ and 3250 to 3250$m$ may transmit a control signal and a command/address signal to NAND flash memory devices 3252 to 3252$m$ in response to a read command received from the processor. Thus, when data is read from the NAND flash memory devices 3252 to 3252$m$, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 3251 may control all operations of the storage device 3250. In embodiments, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210m of another storage server 3200m, or the processors 3110 and 3110n of the application servers 3100 and 3100n. DRAM 3253 may temporarily store (or buffer) data to be written to the NAND flash memory device 3252 or data read from the NAND flash memory device 3252. Also, the DRAM 3253 may store metadata. Here, the metadata may be user data or data generated by the controller 3251 to manage the NAND flash memory device 3252. The storage device 3250 may include a secure element (SE) for security or privacy.

As is traditional in the field, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

The various operations of methods described above may be performed by any suitable means capable of performing the operations, such as various hardware and/or software component(s), circuits, and/or module(s).

The software may include an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The foregoing is illustrative of the embodiments and is not to be construed as limiting thereof. Although a few embodiments have been described, those skilled in the art will readily appreciate that many modifications are possible in the embodiments without materially departing from the present scope.

What is claimed is:

1. A storage system, comprising:
a host device; and
a storage device comprising a solid state drive (SSD), wherein the SSD comprises:
a nonvolatile memory, and
an SSD controller configured to receive a plurality of storage commands and perform operations on the nonvolatile memory based on the plurality of storage commands, wherein the SSD controller comprises at least one processor configured to implement a storage internal protection (SIP) module,
wherein the SIP module is configured to:
obtain, from the host device, the plurality of storage commands;
filter the plurality of storage commands to select a subset of the plurality of storage commands;
apply information about only the subset of the plurality of storage commands to a machine-learning cryptocurrency mining (CM) detection algorithm; and
based on the machine-learning CM detection algorithm indicating that a CM operation is detected, provide a notification to the host device,
wherein the subset of the plurality of storage commands comprises at least one nonvolatile memory command,
wherein the information is related to a memory address corresponding to the at least one nonvolatile memory command, and
wherein the at least one nonvolatile memory command includes at least one nonvolatile memory express (NVMe) command.

2. The storage system of claim 1, wherein the SSD controller is further configured to receive the plurality of storage commands from the host device, and
wherein the SIP module is configured to process the plurality of storage commands in parallel.

3. The storage system of claim 1, wherein the plurality of storage commands is obtained based on a sliding window having a predetermined size.

4. The storage system of claim 1, wherein the machine-learning CM detection algorithm is configured to identify the CM operation based on a pattern associated with the subset of the plurality of storage commands, and
wherein the pattern relates to at least one from among a plurality of memory addresses corresponding to the subset of the plurality of storage commands, a change in the plurality of memory addresses, a number of logical blocks corresponding to the subset of the plurality of storage commands, and a timing pattern of the plurality of storage commands.

5. The storage system of claim 1, wherein the machine-learning CM detection algorithm comprises at least one from among a convolutional neural network, a recurrent neural network, a principal component analysis model, and a random forests model.

6. The storage system of claim 1, wherein the host device includes a SIP application (SIPA) corresponding to the SIP module,
wherein the SIPA is configured to provide an alert to a user of the host device based on the notification, and to receive a user input received from the user, and
wherein the at least one processor is further configured to modify an operation of the SIP module based on the user input.

7. The storage device of claim 1, wherein the memory address comprises a starting logical block address corresponding to the at least one NVMe command.

8. A storage device, comprising:
a solid state drive (SSD), wherein the SSD comprises:
  a nonvolatile memory; and
  an SSD controller configured to receive a plurality of storage commands and perform operations on the nonvolatile memory based on the plurality of storage commands, wherein the SSD controller comprises at least one processor configured to:
    obtain the plurality of storage commands;
    filter the plurality of storage commands to select a subset of the plurality of storage commands;
    apply information about only the subset of the plurality of storage commands to a machine-learning cryptocurrency mining (CM) detection algorithm, and obtain an output of the CM detection algorithm corresponding to the information; and
    based on the output of the machine-learning CM detection algorithm indicating that a CM operation is detected, provide a notification to a user of the storage device,
wherein the subset of the plurality of storage commands comprises at least one nonvolatile memory command,
wherein the information is related to a memory address corresponding to the at least one nonvolatile memory command, and
wherein the at least one nonvolatile memory command includes at least one nonvolatile memory express (NVMe) command.

9. The storage device of claim 8, wherein the plurality of storage commands is obtained based on a sliding window having a predetermined size.

10. The storage device of claim 8, wherein the at least one processor is further configured to obtain the information by extracting a plurality of features from metadata corresponding to the plurality of storage commands.

11. The storage device of claim 10, wherein a feature of the plurality of features comprises at least one from among an operation code corresponding to a storage command from among the plurality of storage commands, a starting logical block address corresponding to the storage command, a number of logical blocks corresponding to the storage command, and a queue identifier corresponding to the storage command.

12. The storage device of claim 10, wherein the at least one processor is further configured to filter the plurality of storage commands based on the extracted plurality of features, and
wherein the information comprises a plurality of features corresponding to the subset of the plurality of storage commands.

13. The storage device of claim 8, wherein the machine-learning CM detection algorithm comprises at least one from among a convolutional neural network, a recurrent neural network, a principal component analysis model, and a random forests model.

14. A method of controlling a storage system, the method being performed by a storage internal protection (SIP) module implemented by at least one processor included in a solid state drive (SSD) of the storage system, the method comprising:
  obtaining, from a host device included in the storage system, a plurality of storage commands corresponding to a nonvolatile memory of the SSD;
  filtering the plurality of storage commands to select a subset of the plurality of storage commands;
  applying information about only the subset of the filtered plurality of storage commands to a machine-learning cryptocurrency mining (CM) detection algorithm, and obtaining an output of the CM detection algorithm corresponding to the information; and
  based on the output of the machine-learning CM detection algorithm indicating that a CM operation is detected, providing a notification to the host device,
wherein the subset of the plurality of storage commands comprises at least one nonvolatile memory express (NVMe) command, and
wherein the information is related to a memory address corresponding to the at least one NVMe command.

15. The storage system of claim 14, wherein the SSD further comprises a host interface configured to receive the plurality of storage commands from the host device, and
wherein the method further comprises processing the plurality of storage commands using the SIP module and the host interface in parallel.

16. The method of claim 14, wherein the subset of the plurality of storage commands is obtained by applying a sliding window having a predetermined size to the plurality of storage commands.

17. The method of claim 14, wherein the machine-learning CM detection algorithm is configured to identify the CM operation based on a pattern associated with the subset of the plurality of storage commands, and
wherein the pattern relates to at least one from among a plurality of memory addresses corresponding to the subset of the plurality of storage commands, a change in the plurality of memory addresses, a number of logical blocks corresponding to the subset of the plurality of storage commands, and a timing pattern of the plurality of storage commands.

18. The method of claim 14, wherein the host device includes a SIP application (SIPA) corresponding to the SIP module, and
wherein the method further comprises:
  providing an alert to a user of the host device based on the notification, and receiving a user input received from the user; and
  modifying an operation of the SIP module based on the user input.

* * * * *